(12) United States Patent
Zhou et al.

(10) Patent No.: US 7,519,474 B2
(45) Date of Patent: Apr. 14, 2009

(54) METHOD AND APPARATUS FOR MEASURING THE RESISTIVITY OF ELECTROMAGNETIC WAVES OF THE EARTH

(76) Inventors: Renan Zhou, No. 290 Shuangqiao Road, Guanshang, Kunming, Yunnan Province, 650200 (CN); Ziren Guo, No. 290 Shuangqiao Road, Guanshang, Kunming, Yunnan Province, 650200 (CN)

( * ) Notice: Subject to any disclaimer, the term of this patent is extended or adjusted under 35 U.S.C. 154(b) by 255 days.

(21) Appl. No.: 10/583,807

(22) PCT Filed: Dec. 2, 2004

(86) PCT No.: PCT/CN2004/001403

§ 371 (c)(1),
(2), (4) Date: Aug. 23, 2006

(87) PCT Pub. No.: WO2005/083468

PCT Pub. Date: Sep. 9, 2005

(65) Prior Publication Data

US 2008/0228401 A1    Sep. 18, 2008

(30) Foreign Application Priority Data

Dec. 25, 2003  (CN) .................. 2003 1 0113035

(51) Int. Cl.
*G01V 3/00*   (2006.01)
*G06F 19/00*  (2006.01)
(52) U.S. Cl. ........................................... 702/7
(58) Field of Classification Search ........ 702/7
See application file for complete search history.

(56) References Cited

U.S. PATENT DOCUMENTS

| | | | | |
|---|---|---|---|---|
| 4,107,597 A | * | 8/1978 | Meador et al. | 324/341 |
| 4,107,598 A | * | 8/1978 | Meador et al. | 324/341 |
| 4,663,593 A | * | 5/1987 | Nekut, Jr. | 324/345 |
| 4,899,112 A | * | 2/1990 | Clark et al. | 324/338 |
| 5,469,062 A | | 11/1995 | Meyer, Jr. | |
| 5,495,174 A | * | 2/1996 | Rao et al. | 324/339 |
| 6,114,972 A | * | 9/2000 | Smith | 340/854.6 |
| 6,163,155 A | | 12/2000 | Bittar | |

(Continued)

FOREIGN PATENT DOCUMENTS

CN    1185508    6/1998

(Continued)

*Primary Examiner*—Michael P. Nghiem
*Assistant Examiner*—Cindy H Khuu
(74) *Attorney, Agent, or Firm*—Alston & Bird, LLP

(57) ABSTRACT

A method for measuring electromagnetic wave resistivity of earth formations is provided. The method uses electric field and magnetic field sensors in conjunction with a data collecting system to obtain data samples from strata, determine certain parameters associated with the data samples, such as a depth coefficient and a surface-layer depth coefficient, establish an observational reference frame based upon an equation defined by the stratum depth (H) and propagation frequency (F) and an equation defined by the electromagnetic wave resistivity ($\rho$) and stratum depth (H), and utilizes the reference frame to record results from a system configured for continuously measuring the electromagnetic wave resistivity of earth formations. The method uses actual data to determine the relationship between the stratum depth (H) and propagation frequency (F), which makes the resistivity of earth formations the only variable to be measured and thus significantly improves the accuracy of depth measurements.

2 Claims, 2 Drawing Sheets

U.S. PATENT DOCUMENTS

| | | | |
|---|---|---|---|
| 6,476,609 B1* | 11/2002 | Bittar | 324/338 |
| 7,191,063 B2* | 3/2007 | Tompkins | 702/2 |
| 2005/0159895 A1* | 7/2005 | Haugland | 702/6 |
| 2005/0189946 A1* | 9/2005 | Moore | 324/338 |
| 2005/0189947 A1* | 9/2005 | Haugland | 324/338 |

FOREIGN PATENT DOCUMENTS

| | | |
|---|---|---|
| CN | 1237247 | 12/2001 |
| CN | 1332380 | 1/2002 |
| WO | PCT/CN2004/001403 | 4/2005 |

* cited by examiner

METHOD AND APPARATUS FOR MEASURING THE RESISTIVITY OF ELECTROMAGNETIC WAVES OF THE EARTH

CROSS-REFERENCE TO RELATED APPLICATIONS

This application claims the benefit of a PCT Application No. PCT/CN2004/001403, entitled "The Method and Apparatus for Measuring Resistivity of Earth by Electromagnetic Waves", filed on Dec. 2, 2004, which claims the benefit of a Chinese Patent Application No. 200310113035.8, filed on Dec. 25, 2003.

FIELD OF THE INVENTION

The present invention generally relates to a method and apparatus in the field of geophysical exploration, and in particular, a method and an apparatus for measuring the electromagnetic wave resistivity by directly converting a frequency into a depth.

BACKGROUND OF THE INVENTION

The traditional magnetotelluric method, which has been widely used in studying the electric nature of the earth since 1950s, is a geophysical exploration method based on the principles of electromagnetic induction. Compared with other electric or electromagnetic methods for studying the electric nature of the earth, the magnetotelluric method has many advantages, such as the ability to measure depths, strong capability of distinguishment, narrower iso-value range, low cost, light outdoor equipment, no shield by high resistant layer, etc. These advantages, to a large extent, result from the fact that the magnetotelluric depth measurement method utilizes natural alternative electromagnetism that has large frequency bandwidth and tremendous power as field source. Built upon the equations of electromagnetic wave, the magnetotelluric depth measurement method includes scalar quantity impedance which is presumed on that planar electromagnetic waves have vertical incidence into the earth surface, and that the earth strata are in the form of horizontal stratified media. When the earth strata possess horizontal non-uniform structure and anisotropy, strata impedance varies with time and direction of the measurement, for which the tensor impendence theory under the magnetotelluric depth measurement method will be used. Many countries including China have developed various magnetotelluric depth measurement apparatuses based on the basic principles of magnetotelluric method. Also based on the magnetotelluric method is a proposed approach to interpret data from outdoor observation. Under this approach, quantitative interpretation is used to inverse delaminated layer of strata with electric nature mainly based on apparent resistivity curve. In real-time measurement, a computer that is configured to automatically inverse would be used to compute a theoretical curve using initial parameters (Hi, ρi), compare the computed theoretical curve with the actual measured curve, and based on the comparison results, continuously modify the parameters in accordance with the minimum variance theory in order to find a theoretical curve that best matches the measured curve. As a result, the parameters corresponding to this theoretical curve are the solution of inversion. Another type of inversion for the magnetotelluric method is built on a continuous one-dimensional model. Under this model, the earth resistivity is viewed as a function of the earth isotropy that varies with depths continuously. Similarly, this inversion method still starts with an initial model to compute a theoretical curve, compares this theoretical curve with the actual measured curve, modifies the initial model so as to gradually get close to the actual measured curve, and finally obtains a unique resistivity curve in which the resistivity continuously varies with depth. The magnetotelluric depth measurement method has been employed to study the earth mantle, inspect and explore sedimentary basin and earth formations containing petroleum and gas, locate and explore thermal fields, forecast earthquake, search for metal minerals and underground water source, and so forth.

Although the magnetotelluric method has been widely used, it does not offer highly precise exploration results. Under this method, oftentimes the thickness of each stratified layer is up to hundreds of meters, and sometimes even thousands of meters, and cannot be lowered down to tens of meters. Therefore, the use of this method in mineral exploration is limited for lack of sufficient exploration efficiency.

BRIEF SUMMARY OF THE INVENTION

The present invention seeks to overcome the above-stated defects and provide a method and apparatus for measuring electromagnetic wave resistivity of the earth in a large range of detectable depths. It also provides high precision and high efficiency without being shielded by high resistant layer.

In accordance with the present invention, the above objects and other objects, features, and advantages will be carried out by systems and methods for providing integrated global shipment and virtual inventory.

According to one embodiment of the present invention, a method for measuring resistivity of electromagnetic waves of the earth is provided. The method comprises the steps of (1) establishing a linear coordinate system for observation and presetting initial parameters for capturing data, wherein, said linear coordinate system is based on an equation between a propagation frequency (F) and a stratum depth (H), said equation being $F = a + bK'/H$, wherein, F is the propagation frequency and its unit is Hz, H is the strata depth and its unit is meter, a is a surface-layer coefficient having a small and neglectable value, b is a coefficient in regional stratum resistivity varied with the stratum depth, having a value of 0.1, K' is a measured depth that is defined during the propagation of the electromagnetic wave in the strata, wherein, said initial parameters include a measurement starting depth (H1), a measurement ending depth (H2), and a sampling interval value (S); (2) determining a depth coefficient (B) via the steps of: (a) selecting a known drilling well in a region to be measured or a region adjacent to said region to be measured; (b) performing exploration and measurement around said known drilling well to obtain a curve of electromagnetic wave resistivity; (c) comparing said curve obtained in step (b) with a curve of the electromagnetic wave resistivity of the known drilling well to determine said depth coefficient (B), wherein said comparing further comprises: i. selecting a segment from said curve obtained in (b) and comparing with a corresponding segment of said curve of the electromagnetic wave resistivity of the known drilling well; ii. determining a sampling interval S' using an equation of $S' = (Hp2 - Hp1)/(L2 - L1)$, wherein, Hp1 is a depth of a characteristic point of a first well logging curve of the known drilling well and its unit is meter, Hp2 is a depth of a characteristic point of a second well logging curve of the known drilling well and its unit is meter, L1 is the number of a collection point of a newly measured curve of the electromagnetic wave resistivity which has similar characteristics as that of the characteristic point of the curve of the first well logging, and L2 is the number of a collection point of a newly measured curve of the electromagnetic wave resistivity which has similar characteristics as that of the characteristic point of the curve of the second well logging; and i. responsive to the determination, determining said depth coefficient (B) through equations of (a) E=S'/S and (b) B=EbK', wherein, B is used to substitute the value of bK' in said equation of F=a+bK'/H, thereby resulting in an equation of H=BT, wherein T is a period and its unit is microsecond, wherein B is in a range of 0.001-1.000; (3) calibrating a surface-layer depth coefficient (Ha) through the steps of: (a) comparing said curve obtained in step (2)(b) with said curve of the electromagnetic wave resistivity of the known drilling well in respective segments to obtain a value of system error of depths at each characteristic point, said value of system error being Ha=Hd−Hc, wherein, Ha is a surface-layer depth coefficient, Hd is a depth of the characteristic point of electrical well logging of the known drilling well, and Hc is a depth of said characteristic point of the electromagnetic wave resistivity curve; and (b) using said surface-layer depth coefficient Ha to calibrate a surface-layer depth for a measured depth using the curve of the electromagnetic wave resistivity, wherein the calibrated measurement starting depth is: H1$j$=H1±Ha; (4) determining other parameters through the steps of: (a) determining a measurement starting depth or a measurement ending depth for data capturing purposes based on pre-specified needs; (b) selecting a number of sampling intervals depending on different conditions including: i. for comparing different regional strata and tracking electrical interfaces of different, 5 meter, 10 meter or 20 meter being selected as said sampling intervals; and ii. for tracking and detecting ore bed such as oil bed, coal bed and metal ore bed or a crack band, 0.2 meter, 0.5 meter or 1 meter being selected as said sampling intervals; wherein, a number of sampling points can be determined depending on different conditions including: i. taking 8 points when the finishing depth is less than or equal to 1000 meter; ii. taking 16 points when the finishing depth is less than or equal to 2000 meter; iii. taking 32 points when the finishing depth is less than or equal to 4000 meter; and iv. taking 64 points when the finishing depth is less than or equal to 8000 meter; wherein, the corresponding sampling periods being 128, 64, 32 and 16 respectively; (c) determining a channel gain by selecting the first channel (CH1) and second channel (CH2) when a double sensor is used, and selecting the first to eighth channels (CH1-CH8) while a multi sensor is used; (d) providing a lowpass filter by using an automatic tracing filter in shallow strata or where there is strong industrial power supply interference; and (5) determining whether data captured through the steps (1) to (4) meets a quality standard required of original data, and responsive to the determination that the standard is met, recording said data in a data capturing, controlling and processing system, wherein said system is configured to: (a) receive said measurement starting depth and said sampling intervals determined through the steps (1) to (4); (b) determining proportions of a vertical coordinate with respect to a horizontal coordinate at an interface of said linear coordinate system for observation; and (c) processing said data to produce a result graph containing data results.

An alternative embodiment of the present invention is an apparatus for measuring the electromagnetic wave resistivity of the earth, which comprises: an electric field sensor for receiving a signal of electric field intensity; an magnetic field sensor for receiving a signal of magnetic field intensity; at least two preamplifiers that are respectively connected to said electric field sensor and said magnetic field sensor; a data capturing system in connection with said preamplifiers; and a system for data capturing, controlling, data storing and processing, wherein, said data capturing system is connected to said system of for data capturing, controlling, data storing and processing via a data bus and a control bus, wherein, said system for data capturing, controlling, data storing and processing is configured for storing a H-F equation showing relations between a stratum depth (H) and a propagation frequency (F) and a ρ-H equation showing relations between an electromagnetic wave resistivity (ρ) and the stratum depth (H), said system for data capturing, controlling, data storing and processing is further configured for processing data based upon said H-F equation and said ρ-H equation, and said system for data capturing, controlling, data storing and processing is further configured for executing instructions for continuous measurement of electromagnetic wave resistivity of the earth.

BRIEF DESCRIPTION OF THE SEVERAL VIEWS OF THE DRAWING(S)

Having thus described the invention in general terms, reference will now be made to the accompanying drawings, which are not necessarily drawn to scale, and wherein:

DETAILED DESCRIPTION OF THE INVENTION

The present inventions now will be described more fully hereinafter with reference to the accompanying drawings, in which some, but not all embodiments of the inventions are shown. Indeed, these inventions may be embodied in many different forms and should not be construed as limited to the embodiments set forth herein; rather, these embodiments are provided so that this disclosure will satisfy applicable legal requirements. Like numbers refer to like elements throughout.

In accordance with one embodiment of the present invention, a method and apparatus for measuring resistivity of the electromagnetic waves of the earth are designed upon the following principles. Under certain circumstances, a linear relationship exists between the stratum depth and the propagation frequency of electromagnetic waves. Unlike the conventional method for measuring depths and thickness based on the multi-variable theory and equation, under the present method actual data may be used directly to determine the relationships between the stratum depth and the propagation frequency of electromagnetic waves, which makes the resistivity the only variable. As a result, a resistivity curve that reflects the changes of resistivity with different depths can be produced from various data captured from each data capturing point, such as the electric field intensity and magnetic field intensity of each data capturing point.

The electromagnetic wave propagation theory provides that the field intensity propagates in strata exponentially. In other words, the amplitude of the electric field attenuates with the stratum depths exponentially. Thus, in the traditional methods using electromagnetic waves, skin depths are used to estimate the measured depths. In one embodiment of the present invention, the measured depth is dependent on the sensitivity of the apparatus and the intensity of the incidence field source. If the intensity of the incidence field source is constant, the higher the sensitivity of the apparatus, the deeper the earth can be detected. Typically, the detectable depth can fall in a wide range of variation. For example, if the depth of detection is defined as the amplitude attenuated to $1/e^3$ (5%), the depth of detection (i.e., value of variable K') is three times of the value of skin depth K. In certain conditions, a linear relationship exists between the stratum depth and the propagation frequency of the electromagnetic wave.

Figure 1:
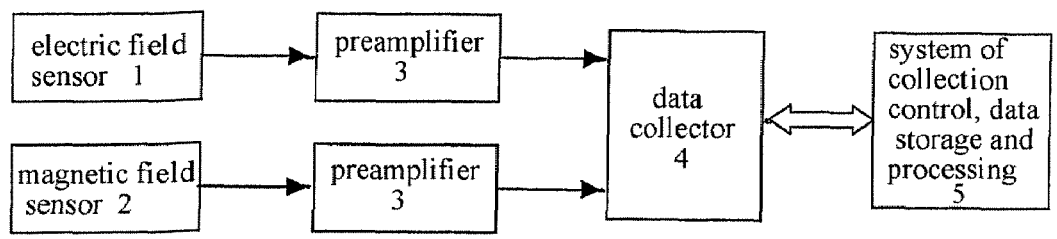
FIG. 1 is a block diagram of an apparatus for measuring resistivity of the electromagnetic waves of the earth according to one embodiment of the present invention.

Referring to FIG. 1, an apparatus for measuring resistivity of electromagnetic waves of the earth according to one embodiment of the invention will be described. As shown in FIG. 1, the apparatus comprises five primary components: an electric field sensor 1 configured for receiving signals of the electric field intensity, a magnetic field sensor 2 configured for receiving signals of the magnetic field intensity, two preamplifiers 3, a data capturing system 4, and a system for data capturing, controlling, data storage and processing 5. As a person of ordinary skill may understand, the apparatus is not limited to the above-mentioned components, but may comprise various combinations thereof or even additional components.

As seen in FIG. 1, in implementation, the output port of the electric field sensor 1 is connected to the input port of one preamplifier 3, while the output port of the magnetic field sensor 2 is connected to the input port of the other preamplifier 3. In addition, the output ports of two (or multiple) preamplifiers 3 are respectively connected to at least two (or multiple) input ports (CH1, CH2 . . . CHn) of the data capturing system 4. There are at least two different ways to connect the data capturing system 4 with the system 5. One option is to connect a parallel port of the data capturing system 4 to a printer port of the system 5. Alternatively, a parallel port of the data capturing system 4 is connected to a parallel port of the system 5. In operation, data captured by the data capturing system 4 is transmitted to the system 5 for data capturing, controlling, data storage and processing. In the meantime, the system 5 for data capturing, controlling, data storage and processing sends instructions for data controlling and capturing to the data capturing system 4.

The electric field sensor 1 is comprised of one or more pairs of copper or lead electrodes, or other non-polarized electrodes. Typically, the magnetic field sensor 2 comprises multiturn annular induction coils or multiturn annular induction coils with negative feedback of flux. The electric field sensor 1 is configured to receive signals of the electric field intensity (Ex), while the magnetic field sensor 2 is configured to receive signals of the magnetic field intensity (Hy).

Figure 2:
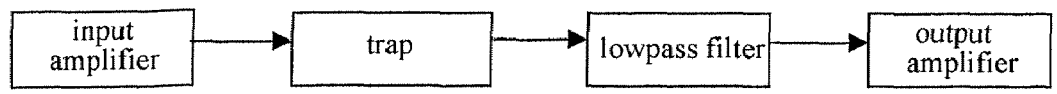
FIG. 2 is a block diagram of preamplifiers in the apparatus of FIG. 1 according to one embodiment of the present invention.

The preamplifier 3 is illustrated in further detail in FIG. 2. As shown in FIG. 2, each of the preamplifiers 3 may further comprise an input amplifier, a multistage trap, a low-pass filter and an output amplifier. The preamplifier 3 can amplify the signals received respectively by the electric field sensor and the magnetic field sensor and filter out any interfering signals caused by industrial power supply and its harmonic waves so as to eliminate aliasing interference.

The data capturing system 4 can be any high-speed data capturing system well-known in the art. Preferably, a qualified data capturing system 4 has the following features: (1) a sampling frequency of 1 MHz which is program-controllable, (2) the number of channels equal or exceeding 6, (3) an A/D switch having 12 or 16 bits and an adjustable gain in a range of 1-100, (4) synchronised wave forms, and (5) a program-controlled antialiasing filter. Under the program control, the data capturing system 4 digitizes the analog signals received from the preamplifiers 3, and then sends the digital signal output, which are divided into groups of different frequencies, to the system 5 for data capturing, controlling, data storage and processing.

In one embodiment of the present invention, the system 5 for data capturing, controlling, data storage and processing includes a laptop or desktop computer that is pre-configured to execute software programs that are stored in the laptop or desktop memory. Those software programs include, and not limited to, a program for determining frequencies using the equation of F=a+B/H, and a program for pre-setting various parameters for measurement. The system 5 is able to control via instructions the data capturing system 4, accomplish the data capturing tasks pursuant to certain requirements, and record the data results in the storage devices, such as hard disks of the laptop or desktop. There is also program for data processing, which is configured to convert the captured electric field intensity Ex and the captured magnetic field intensity Hy into the electromagnetic wave resistivity based on the equation of $\rho=|Ex/Hy|^2/\omega\mu$ under the magnetotelluric method. The final outcome can be printed out from printers connected to the laptop or desktop computer.

By means of controlling software of the apparatus, data at different depths can be captured by continuously changing the frequency to obtain the electric field intensity and the magnetic field intensity at corresponding depths. Under the above-described apparatus, data can be captured at a regular interval up to 0.2 meter in depth. Also, data can be captured from any points of depth within any segment of depth that falls within the pre-determined technical range. A real-time display can be provided to show curves that reflect the changes of the electric field intensity and the magnetic field intensity with different depths. Using the data processing software to process the captured data right on site can result in a curve of the electromagnetic wave resistivity ρ which varies with the depth H.

To illustrate the method for measuring resistivity of electromagnetic waves of the earth, the following step-by-step process will be described in detail. It would be obvious to a skilled artisan that the following process presents one embodiment, and not all embodiments of the present invention.

At Step 1, the process establishes a linear coordinate system for observation and presets initial parameters for data capturing. Specifically, in the established linear coordinate system, the relation between the propagation frequency and the stratum depth is defined by the equation below:

$$F=a+bK'/H \tag{1}$$

In this equation, F is the propagation frequency and its unit is Hz; H is the stratum depth and its unit is meter; a is a surface-layer coefficient which is a small value and can be neglected in the first step; b is a coefficient in regional stratum resistivity which varies with the depth and value of which is set to be 0.1; and K' is a depth of collection which is defined during the propagation of the electromagnetic wave in the strata.

The preset initial parameters include a measurement starting depth value (H1), a measurement ending depth value (H2), and a data sampling interval value (S). All three values, H1, H2 and S, are measured in meters.

Before measurement, the initial parameters, the starting depth value H1, the ending depth value H2 and the sampling interval value S, are used to determine the parameter F according to the equation (1). Then the determined F will be preset, in addition to other parameters, in the apparatus for measuring the electromagnetic wave resistivity of the earth so as to ensure the apparatus operates as required.

At Step 2, a depth coefficient (B) is determined through the following steps:

First, select a known drilling well or well borehole in a detecting region or its adjacent regions. In one preferred embodiment, the following conditions should be met: (1) the earth formations and strata are representative; (2) data of resistivity well logging or drill well core are available; (3) an inclination angle of the strata is less than or equal to 15°; and (4) there is no interference of strong industrial electricity network on the surface. If the region is new without any known drilling well or borehole, a depth coefficient of other regions similar to this region can be used as replacement. Alternatively, data obtained from other strata that share the same electrical nature as the region to be explored or detected.

After the known drilling well is selected, exploration and measurement can be made surrounding the known drilling well to obtain a curve of the electromagnetic wave resistivity. Then, the next step in the process is to compare this curve with a curve of the electromagnetic wave resistivity of the known drilling well and determine whether the two curves are similar to each other at each characteristic point. If the two curves are not matching to the satisfaction, the electric field sensor and the magnetic field sensor will be turned a certain angle to start capturing new data. This data capturing and comparing process will repeat until a most matching curve is found. At that point, the vertical coordinate of the measured curves represents the electromagnetic wave resistivity, the electric field intensity and the magnetic field intensity, and the horizontal coordinate of the measured curves represents sequence number of each data-captured points.

The parameter B can be determined through the following steps:

By selecting a segment from the measured curve of the electromagnetic wave resistivity and comparing the segment with the curve of electromagnetic wave resistivity of the known drilling well, a sampling interval S' can be obtained from the equation below:

$$S'=(Hp2-Hp1)/(L2-L1) \quad (2)$$

In the above equation, Hp1 is a depth of a characteristic point of a first well logging curve of the known drilling well and its unit is meter; Hp2 is a depth of a characteristic point of a second well logging curve of the known drilling well and its unit is meter; L1 is the sequence number of a collection point of a newly measured curve of the electromagnetic wave resistivity which has similar characteristics as that of the characteristic point of the curve of the first well logging; and L2 is the sequence number of a collection point of a newly measured curve of the electromagnetic wave resistivity which has similar characteristics as that of the characteristic point of the curve of the second well logging.

If using $$E=S'/S \quad (3)$$

and then $$B=EbK'$$

where

B is an actually determined depth coefficient which is used to substitute the value of bK' in the equation (1) to conduct conversion between the propagation frequency and the strata depth; after simplifying, the equation (1) becomes:

$$H=BT \quad (4)$$

where

T is a period and its unit is microsecond;

B is among a range of 0.001-1.000;

In a new region without a known well, a depth coefficient of in other region which is similar to this region can be used for the new region. The measurement can be implemented after the basic relational expression is calibrated, and agreeable results can also be obtained. A set of the depth coefficients that are pre-verified in practice is preset in the apparatus for use.

At Step 3, a surface-layer depth coefficient (Ha) is adjusted and calibrated through the following steps:

Compare the curve determined in the second step with the curve of the electromagnetic wave resistivity of the known drilling well, segments by segments, and the value of system error between respective depths of each characteristic point is expressed below:

$$Ha=Hd-Hc$$

where

Ha is a surface-layer depth coefficient;

Hd is a depth of the characteristic point of electrical well logging of the known drilling well;

Hc is a depth of said characteristic point of the electromagnetic wave resistivity curve; and the units for Ha, Hd, and Hc are meter;

Then, use the surface-layer depth coefficient Ha to calibrate depth of the surface layer for the measured depth of the curve of the electromagnetic wave resistivity. As a result, the calibrated staring initial measured depth is:

$$H1j=H1\pm Ha.$$

At Step 4, other data capturing parameters are selected in the following process:

(1) determining a starting depth or an ending depth for data capturing purposes.

(2) selecting sampling interval, as shown in the exemplary process below:
  a. using 5 meter, 10 meter or 20 meter as sample interval for comparing regional strata and tracking down electrical interface of strata;
  b. using 0.2 meter, 0.5 meter or 1 meter as sample interval for tracking and detecting ore bed (e.g., oil bed, coal bed and metal ore bed) or a crack band;
  c. setting the numbers of sampling depending on the depth of each sampling point; For example,
    taking 8 points when the finishing depth is less than or equal to 1000 meter;
    taking 16 points when the finishing depth is less than or equal to 2000 meter;
    taking 32 points when the finishing depth is less than or equal to 4000 meter;
    taking 64 points when the finishing depth is less than or equal to 8000 meter;
  d. using 128, 64, 32 and 16 as values of sampling period;

(3) Providing a channel gain. More specifically, when a double sensor is used, the first channel (CH1) and second channel (CH2) would be selected. But when a multi sensor is used, the first to eighth channels (CH1-CH8) would be selected. Generally speaking, a lower gain is selected to suppress the interference from the industrial alternative current power as long as there is guarantee that signals from the targeted stratum segment can be captured.

(4) Providing a lowpass filter. This means that an automatic tracing filter will be used when there is strong interference caused by industrial power supply or the depths of shallow strata are being measured. In deep strata or when industrial power supply interference is weak, using an automatic tracing filter is not necessary.

Figure 3A:
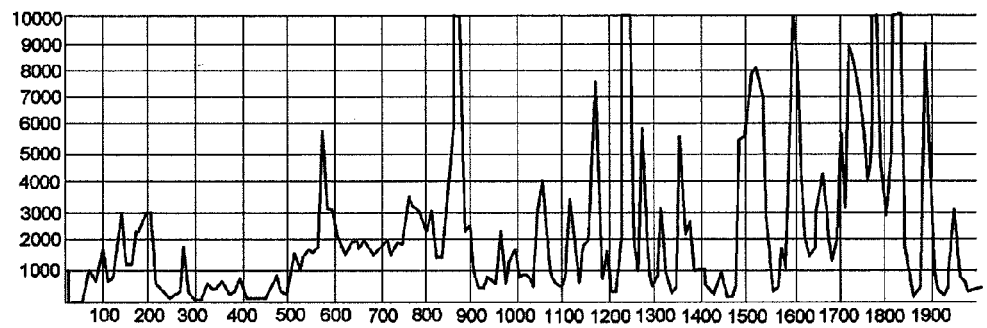
FIGS. 3A, 3B and 3C are graphs for showing results of processed data from the apparatus of FIG. 1 according to one embodiment of the present invention.
Figure 3B:
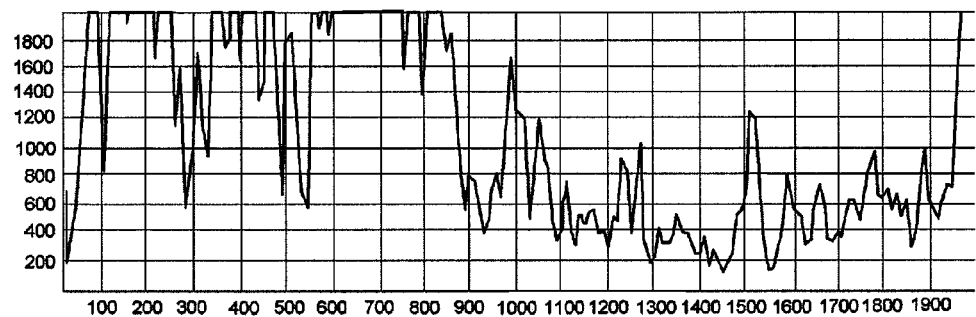
Figure 3C:
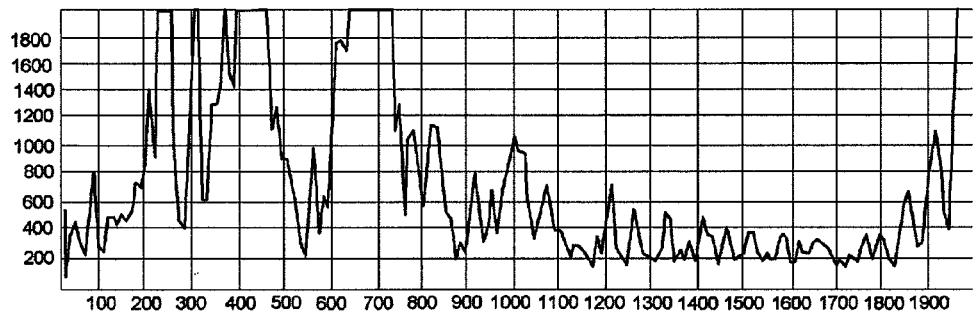

Step 5 is to capture and compile data for on-site processing. Once the captured data is determined to meet a quality standard based on the original data, the data can be processed on site by using the above-described apparatus. All the data records and documents will be transmitted to the programs in the system 5 for data capturing, controlling, data storage and processing. The data input also includes the measurement starting depth and the calibrated sampling interval. Based on the processed data, the proportions of respective vertical and horizontal coordinates can be determined at the interface. As a result, a graph of results, such as the one shown in FIGS. 3A, 3B and 3C, can be achieved finally. In FIGS. 3A, 3B and 3C, the horizontal coordinate is a linear coordinate and represents a depth. The depth scale can be adjusted pursuant to predefined requirements. The vertical coordinate represents the electromagnetic wave resistivity in the upper curve, which can be either a linear coordinate or a logarithmic coordinate, the electric field intensity in the middle curve, and the magnetic field intensity in the lower curve. As will be appreciated by a person of ordinary skill, all the scales and proportions of these coordinates are adjustable.

In comparison with existing methods for measuring electromagnetic wave resistivity of the earth, the above-described method in accordance with one embodiment of the present invention improves the stratifying precision when the measured depth is the same. Therefore, the present method can enhance the application of the magnetotelluric method from only general investigation to further exploration. Under this method, fewer wells will be drilled and the exploration will be more efficient and effective in its entirety. When the same depth is measured, lower sensitivity of an apparatus is required, which makes the design and manufacturing of the apparatus easier in operation. This method also improves the exploration efficiency by reducing the measuring time, outside interference, drift of the apparatus and polarization of electrodes, and so forth. It also simplifies the interpretation of data from outdoor observation. In the one-dimensional interpretation, when the depth is determined, the electromagnetic wave resistivity can be easily obtained from the electric field intensity and the magnetic field intensity at each depth point, which provides much convenience in processing data right on site. The fact that a resistivity curve varying with the depth can be measured without drilling a well greatly enhances the ability to solve geological problems using physical geographical methods for exploration. For example, the flood layer in an oil field can be monitored, distribution of crack band can be located, comparison between layers can be easily made, coal bed, metal ore bed and other mineral beds can be tracked down. The present method and apparatus for measuring the resistivity of electromagnetic waves of the earth can be applied in different stages of exploration, and as a result, ultimately improve the efficiency and effectiveness of exploration in its entirety. In particular, the present method and apparatus provides an effective means for deep exploration. In one embodiment of the invention, the method and apparatus is applicable in the field of the source-powered electromagnetic depth measurements.

In concluding the detailed description, it should be noted that it will be obvious to those skilled in the art that many variations and modifications can be made to the preferred embodiment without substantially departing from the principles of the present invention. Also, such variations and modifications are intended to be included herein within the scope of the present invention as set forth in the appended claims. Further, in the claims hereafter, the structures, materials, acts and equivalents of all means or step-plus function elements are intended to include any structure, materials or acts for performing their cited functions.

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Although specific terms are employed herein, they are used in a generic and descriptive sense only and not for purposes of limitation.

That which is claimed:

1. A method for measuring resistivity of electromagnetic waves of the earth, comprising:
   (1) establishing a linear coordinate system for observation and presetting initial parameters for capturing data, wherein, said linear coordinate system is based on an equation between a propagation frequency (F) and a stratum depth (H), said equation being $F=a+bK'/H$, wherein, F is the propagation frequency and its unit is Hz, H is the strata depth and its unit is meter, a is a surface-layer coefficient having a small and neglectable value, b is a coefficient in regional stratum resistivity varied with the stratum depth, having a value of 0.1, K' is a measured depth that is defined during the propagation of the electromagnetic wave in the strata, wherein, said initial parameters include a measurement starting depth (H1), a measurement ending depth (H2), and a sampling interval value (S);
   (2) determining a depth coefficient (B) via the steps of: (a) selecting a known drilling well in a region to be measured or a region adjacent to said region to be measured; (b) performing exploration and measurement around said known drilling well to obtain a curve of electromagnetic wave resistivity; (c) comparing said curve obtained in step (b) with a curve of the electromagnetic wave resistivity of the known drilling well to determine said depth coefficient (B), wherein said comparing further comprises: i. selecting a segment from said curve obtained in (b) and comparing with a corresponding segment of said curve of the electromagnetic wave resistivity of the known drilling well; ii. determining a sampling interval S' using an equation of $S'=(Hp2-Hp1)/(L2-L1)$, wherein, Hp 1 is a depth of a characteristic point of a first well logging curve of the known drilling well and its unit is meter, Hp2 is a depth of a characteristic point of a second well logging curve of the known drilling well and its unit is meter, L1 is the number of a collection point of a newly measured curve of the electromagnetic wave resistivity which has similar characteristics as that of the characteristic point of the curve of the first well logging, and L2 is the number of a collection point of a newly measured curve of the electromagnetic wave resistivity which has similar characteristics as that of the characteristic point of the curve of the second well logging; and iii. responsive to the determination, determining said depth coefficient (B) through equations of (a) $E=S'/S$ and (b) $B=EbK'$, wherein, B is used to substitute the value of bK' in said equation of $F=a+bK'/H$, thereby resulting in an equation of $H=BT$, wherein T is a period and its unit is microsecond, wherein B is in a range of 0.001-1.000;

(3) calibrating a surface-layer depth coefficient (Ha) through the steps of: (a) comparing said curve obtained in step (2)(b) with said curve of the electromagnetic wave resistivity of the known drilling well in respective segments to obtain a value of system error of depths at each characteristic point, said value of system error being Ha=Hd−Hc, wherein, Ha is a surface-layer depth coefficient, Hd is a depth of the characteristic point of electrical well logging of the known drilling well, and Hc is a depth of said characteristic point of the electromagnetic wave resistivity curve; and (b) using said surface-layer depth coefficient Ha to calibrate a surface-layer depth for a measured depth using the curve of the electromagnetic wave resistivity, wherein the calibrated measurement starting depth is:

H lj=H 1+Ha;

(4) determining other parameters through the steps of: (a) determining a measurement starting depth or a measurement ending depth for data capturing purposes based on pre-specified needs; (b) selecting a number of sampling intervals depending on different conditions including: i. for comparing different regional strata and tracking electrical interfaces of different, 5 meter, 10 meter or 20 meter being selected as said sampling intervals; and ii. for tracking and detecting ore bed such as oil bed, coal bed and metal ore bed or a crack band, 0.2 meter, 0.5 meter or 1 meter being selected as said sampling intervals; wherein, a number of sampling points can be determined depending on different conditions including: i. taking 8 points when the finishing depth is less than or equal to 1000 meter; ii. taking 16 points when the finishing depth is less than or equal to 2000 meter; iii. taking 32 points when the finishing depth is less than or equal to 4000 meter; and iv. taking 64 points when the finishing depth is less than or equal to 8000 meter; wherein, the corresponding sampling periods being 128, 64, 32 and 16 respectively; (c) determining a channel gain by selecting the first channel (CH 1) and second channel (CH2) when a double sensor is used, and selecting the first to eighth channels (CH1-CH8) while a multi sensor is used; (d) providing a lowpass filter by using an automatic tracing filter in shallow strata or where there is strong industrial power supply interference; and (5) determining whether data captured through the steps (1) to (4) meets a quality standard required of original data, and responsive to the determination that the standard is met, recording said data in a data capturing, controlling and processing system, wherein said system is configured to:
 (a) receive said measurement starting depth and said sampling intervals determined through the steps (1) to (4), and establish a relation of the strata depth and the period by said equation H=BT;
 (b) collect data of an electric field intensity and data of a magnetic field intensity at different strata depths by continuously changing the frequency, and establishing a relation between the electric field intensity and the strata depth and a relation between the magnetic field intensity and the strata depth;
 (c) establish a relation between the electromagnetic wave resistivity and the strata depth by means of the relation between the electric field intensity and the strata depth, the relation between the magnetic field intensity and the strata depth, and a relation among the electromagnetic wave resistivity, the electric field intensity, and the magnetic field intensity;
 (d) determine proportions of a vertical coordinate with respect to a horizontal coordinate at an interface of said linear coordinate system for observation in which the vertical coordinate represents the electromagnetic wave resistivity and the horizontal coordinate represents the strata depth; and
 (e) produce a result graph according to the relation between the electromagnetic wave resistivity and the strata depth.

2. The method of claim 1, wherein said known drilling well is selected to satisfy one or more conditions including: (1) the strata being representative, (2) data of resistivity well logging or drill well core being available, (3) an inclination angle of the strata being less than or equal to 15°, and (4) no interference of strong industrial electricity network on the earth.

* * * * *